_United States Patent_ [19]

Benny et al.

[11] 4,394,259

[45] Jul. 19, 1983

[54] VACUUM PNEUMATIC CONVEYING APPARATUS AND METHOD FOR TRANSFERRING FOOD PRODUCTS

[75] Inventors: John R. Benny, Seattle; Robert W. Buher, Kent; Paul K. Smith, Kirkland, all of Wash.

[73] Assignee: TEMCO, Inc., Bellevue, Wash.

[21] Appl. No.: 315,368

[22] Filed: Oct. 27, 1981

[51] Int. Cl.³ .......................... B03B 7/00; A22C 25/08
[52] U.S. Cl. ...................................... 209/250; 209/31; 209/143; 43/65; 406/151
[58] Field of Search ..................... 209/143, 250, 21–23, 209/36, 37, 300, 30, 31; 406/115, 116, 151, 152, 168, 169, 171, 181; 119/3; 43/6.5

[56] References Cited

U.S. PATENT DOCUMENTS

| | | | |
|---|---|---|---|
| 2,861,841 | 11/1958 | Pengra | 406/152 |
| 2,889,906 | 6/1959 | Linderoth | 406/169 X |
| 3,226,164 | 12/1965 | Merrick | 406/82 |
| 3,614,167 | 10/1971 | Paterson | 406/48 |
| 3,829,165 | 8/1974 | Boon | 406/171 |
| 3,871,332 | 3/1975 | Hayashi | 43/6.5 X |
| 3,884,528 | 5/1975 | Shaddock | 406/115 |
| 4,009,913 | 3/1977 | Beugelink | 406/152 |

FOREIGN PATENT DOCUMENTS

| | | | |
|---|---|---|---|
| 1208686 | 1/1966 | Fed. Rep. of Germany | 406/151 |
| 121041 | 11/1927 | Switzerland | 209/143 |
| 728916 | 4/1980 | U.S.S.R. | 209/250 |

_Primary Examiner_—Ralph J. Hill

_Attorney, Agent, or Firm_—Roy E. Mattern, Jr.

[57] ABSTRACT

Vacuum pneumatic conveying apparatus and method are utilized to transfer food products, such as fish, from a boat to a processing factory directly or via a tender vessel. Fish products such as salmon, are withdrawn from a fishing boat through an intake nozzle of a pneumatic vacuum system and entrained in an air flow, upwardly through inlet or receiving conduits of a vacuum, pneumatic, conveying system, and on through a product separator of an in line assembly of an upper product separator and a lower liquid separator. Salmon continue on flying out of the product separator and commence their downwardly momentum and gravity induced travel through discharge conduits, encompassing essentially non flowing air maintained under continuing vacuum. They reach a lower exit volume and collect temporarily in an active changing group to intermittently force open, against barometric pressure, an otherwise self sealing, flexible discharge sleeve, to be discharged without injury and conveyed elsewhere in a fish processing factory. The air flow under vacuum in which the salmon are entrained eventually flows through an enlarged downwardly directed internal conduit within the product separator, to escape radially through a longitudinally grilled exit, and the salmon continue on via their momentum downwardly for discharge. The escaping air flow expands and reverses, separating its water and flows through a rotary positive displacement blower into the atmosphere.

20 Claims, 12 Drawing Figures

VACUUM PNEUMATIC CONVEYING APPARATUS AND METHOD FOR TRANSFERRING FOOD PRODUCTS

BACKGROUND OF THE INVENTION

Vacuum pneumatic conveying apparatus and methods have been utilized in the past to convey food products. In U.S. Pat. No. 3,614,167 William C. Patterson illustrated and described his vacuum pneumatic conveying apparatus, which also utilized water to eventually receive the conveyed fish and to air seal the discharge end of his chamber, through which the fish were conveyed. Earlier Wallace N. Merrick in his U.S. Pat. No. 3,226,164 disclosed his vacuum pneumatic conveying apparatus which likewise utilized water to eventually receive the conveyed fish and to air seal the discharge fish conveyor located at the end of his chamber.

Mr. Takeshi Hayashi in his U.S. Pat. No. 3,871,332 discloses his fish transfer apparatus wherein vacuum pneumatic conveying apparatus conveys both fish and water, as the air flow is commenced with fish already in the water.

Also Temco Pneumatic Systems in Bellevue, Wash. have used and are using vacuum pneumatic conveying apparatus, not employing water seals as disclosed by Messrs. Patterson and Merrick, but instead using air locks. Once the food products, such as fish, are conveyed to a particular locale, via a vacuum air flow, the air flow is directed so the food products are separated out. Such separation occurs in a cyclone type separator and in the past few years in what is called an in line product flow or straight through product flow separator.

There remained a need, however, for providing improved vacuum pneumatic conveying apparatus which like the early Temco Pneumatic Systems are essentially pneumatic, not relying on water to create air seals nor to stop the food product, possibly only utilizing water, when needed, as a lubricant within a conduit.

SUMMARY OF THE INVENTION

A vacuum pneumatic conveying apparatus and method utilizes a rotary positive displacment blower to create a vacuum air flow. Then a food product is conveyed, i.e. entrained in this vacuum air flow, to a designated locale, where the air flow is expanded and changed in direction, while the food product continues directly on. Such separation is known as the in line product flow or straight through product flow. In this environment of apparatus and method, the improvements made center on effective removal of unwanted moisture, liquid, and/or debris from the vacuum pneumatic conveying apparatus, without interrupting the continuous separation of the food product from the initial conveying vacuum air flow. Previously apparatus and methods employed in in line product flow would at times fail to sufficiently keep the moisture, liquid, and debris, such as fish gurry, from disrupting the otherwise intended continuous operation of the apparatus and methods.

Now a primary product separator sufficiently and continuously separates the food product from the expanding and diverting vacuum air flow. Moreover, when necessary, a secondary liquid separator is utilized in which the separated vacuum air flow is reversed and in so doing is freed of moisture, liquid, and debris, before the vacuum air flow enters the inlet of the rotary positive displacement blower.

Moreover, the collected moisture, liquid, and debris, when necessary, is collected beyond the flow pattern of the vacuum air flow in an observable vertical column of air under vacuum. Then, when accumulated to a weight in excess of barometric pressure, the collected moisture, liquid, and debris is discharged through an air lock. Also the food product is delivered through an observable air lock.

For example, when the air locks are self sealing sleeves, i.e. socks, the conduits adjacent and above the socks, both in respect to the collected food product conduits, and also in respect to the collected moisture, liquid, and/or debris conduits, are made of materials which are sufficiently transparent. Thereby, operating personnel may effectively monitor air lock discharge operations.

Therefore, with these improvements, vacuum pneumatic conveying apparatus and methods of this in line food product flow are continuously undertaken, when required, very reliably, conveying food products free of unwanted moisture, liquid and debris and free of any injury that could be caused by contact of the food products with the conveying apparatus, and the vacuum air flow entering the rotary positive displacement blower is sufficiently clean and dry.

DESCRIPTION OF DRAWINGS OF PREFERRED EMBODIMENTS

The preferred embodiments of the vacuum, pneumatic conveying apparatus and method to convey food products, are illustrated in the drawings, wherein FIGS. 1 through 11 illustrate the conveying, i.e. unloading, of fish such as salmon from a hold of a fishing boat and on to equipment of a fish processing factory, with some of the figures indicating accessories to be utilized when smaller fish and seafood are being transferred via the air flow under vacuum. Then in FIG. 12 the conveying of food products, such as potatoes, is shown wherein some of the equipment used in conveying fish is not needed.

In the drawings, the figures are as follows:

DESCRIPTION OF PREFERRED EMBODIMENTS

General Introduction

In the drawings the overall preferred embodiments are illustrated of vacuum pneumatic conveying apparatus and methods, briefly referred to as in line product flow or straight through product flow conveying apparatus and methods, utilized to convey food products from locale to locale, or point to point. The food products fly upwardly from their source within a conduit directing both the vacuum air flow and the food products, and after separating the food products from this air flow, in new apparatus and using new methods, the food products continue on downwardly by their momentum and then by gravity, within a conduit containing air under vacuum, until reaching the lower exit. There these food products collect in a changing group of changing weight for intermittent discharge from this vacuum pneumatic conveying apparatus via an air lock.

The food products are of many types such as fish as large as salmon and marginally as small as anchovy, and such as vegetables for example, peas of one quarter inch in diameter and larger, diced vegetables of three eighths of an inch in diameter and larger, all root crops such as carrots, potatoes, sugar beets, cauliflower, and fruits such as oranges and other citrus fruits. When handling these food products among the many objectives is to convey them as though they are fragile enough to necessarily avoid their damage by excessive contacts with the conveying apparatus.

The new apparatus and new methods combined with the overall apparatus and methods vary throughout the illustrated embodiments and other embodiments, not illustrated, in different ways depending on the size and/or weight of the food products, and also on how much moisture, liqquid, and/or debris may enter with the food products into the vacuum pneumatic conveying apparatus. Such moisture, liquid, and/or debris must be essentilly withdrawn from the vacuum pneumatic conveying apparatus without interference to the delivery of the food products and without contaminating the vacuum air flow which enters the rotary positive displacement blower after conveying the food product.

A Preferred Embodiment for the Conveying of a Fish Food Product Like Salmon

In FIGS. 1 through 9, inclusive, a preferred embodiment 20 of a vacuum pneumatic conveying apparatus is illustrated being utilized to convey fish 21 such as salmon, from a hold 22 of a fishing boat 24 to sorting conveyors 26 of a fish processing factory 28 located near a dock 30. The salmon 21 arrive on the sorting conveyors 26 without incurring any injury from contacting the various components of the vacuum pneumatic conveying apparatus 20. This apparatus 20 is preferably made of the fifty series of marine aluminum such as 5086-H32. In one particular embodiment, a one hundred horsepower rotary positive displacement blower 32 operates this vacuum pneumatic conveying apparatus 20 to convey thirty to forty tons of fish per hour. The vacuum range is six to ten inches of mercury within the various interconnected vacuum air flow and vacuum air passageways and chambers.

Figure 1:
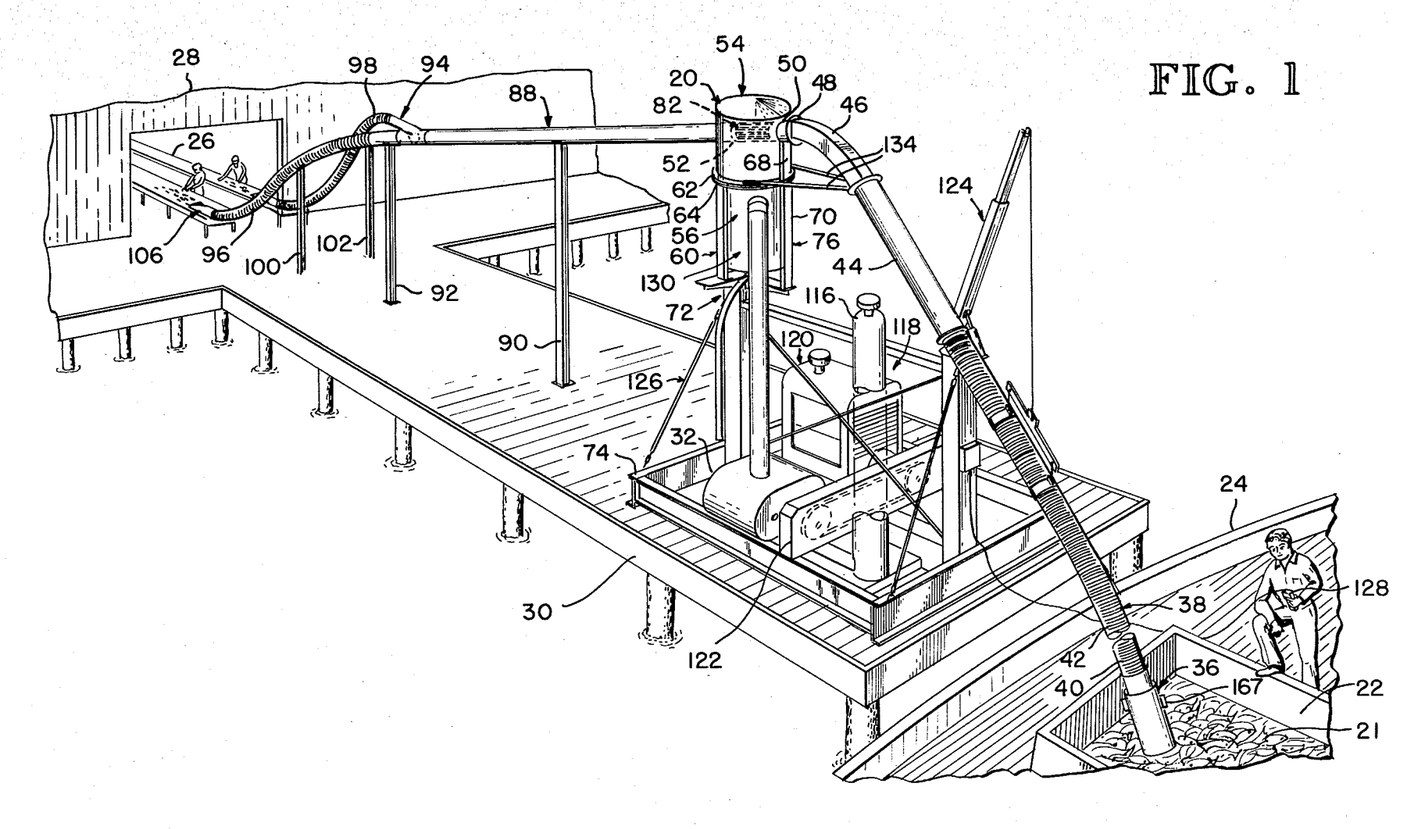
FIG. 1 is an orthographic view of fish unloading methods and apparatus.

As illustrated in FIG. 1, a nozzle 36 is secured to the lower end of a movable and flexible hose 38, or conduit 38, which is preferably made of a clear polyvinylchloride plastic conduit 40, also having a circumferential and spiral reinforcement 42, such as the hoses and conduit currently being identified by the trademark KANA FLEX. This movable and flexible inlet conduit 38 is directed upwardly and secured to non flexible inlet conduits 44, 46 utilizing fastening assemblies 48. Inlet conduit 46, in turn, is secured about an entry 50 of a transverse internal conduit 52, which extends across an upper primary product separator 54.

This separator 54 is a part of the combined in line assembly of this upper product separator 54 and a lower secondary liquid separator 56 both supported by flanges 62, 64, on their separator support 60. This separator support 60 has the circumferential, initially rotatable, abutting flanges 62, 64 secured in a selected radial position by using fastener assemblies 66. Vertical legs 68 of this separator support 60, exend upwardly from the flange 64 on opposite sides to support the respective ends of the transverse internal conduit 52. Also vertical legs 70 of this separator support 60 extend downwardly from flange 62 to a high rise support 72, which in turn is connected to a horizontal base 74 completing an overall frame assembly 76.

Inside the upper primary product separator 54, the transverse internal conduit 52 slopes downwardly in the direction of the vacuum air flow. Although the bottom 80 of the transverse internal conduit 52 is continuous, the sides and top are fitted with a grilled exit 82, having a much larger exit area between the bars or grills 84 than the cross-sectional area of this transverse internal conduit 52. The conveying vacuum air flow therefore expands and changes its direction largely departing from the transverse internal conduit 52 and into the product separator 54, as the fish 21, via their momentum, leave this upper primary product separator 54, through the non flexible outlet conduit 88 supported on stanchions 90, 92. The fish 21 via gravity continue on past a diverting vane valve assembly 94 into one or the other flexible conduits 96, 98, supported by stancions 100 and 102. The fish 21 collect in groups at the ends of the flexible conduits 96, 98, and when the force of their combined weight exceeds the barometric pressure they are discharged through a respective self sealing flexible discharge sleeve 106 on to sorting conveyors 26 of a fish processing factory 28.

The horizontal base 74 shown secured on the dock 30 is preferably made large enough to serve as a unitized base for other apparatus of this embodiment 20. The rotary positive disc placement blower 32 equipped with a silencer 116, driven by a diesel engine 118, supplied with fuel from a fuel tank 120, via a transmission 122, are all mounted on this horizontal and unitized base 74. Also a crane 124 is often mounted on this base 74 and it is initially used in assembly of the apparatus to be subsequently mounted on this base 74. Following such assembly, the crane 124 is operated during conveying operations to position the flexible inlet conduit 38. Various angular braces 126 are used where necessary. Preferably remote crane controls 128 are available to be operated by a person who is positioning the inlet nozzle 36 over and in the fish 21 in the hold 22 of the fishing boat 24 moored alongside the dock 30. Such person and other persons must correctly monitor the positioning of the inlet nozzle 36 to insure the maximum conveying efficiency, and to also avoid the nozzle's rubbing, bearing, and/or catching against a portion of the ship during its tidal and/or wave motions relative to the dock and the inlet nozzle 36. Although there is flexibility afforded by the flexible inlet conduit 38 and some additional tension loading is possible, any lifting tendency via the nozzles 36, etc., of the boat in part or in whole should be avoided.

Figure 2:
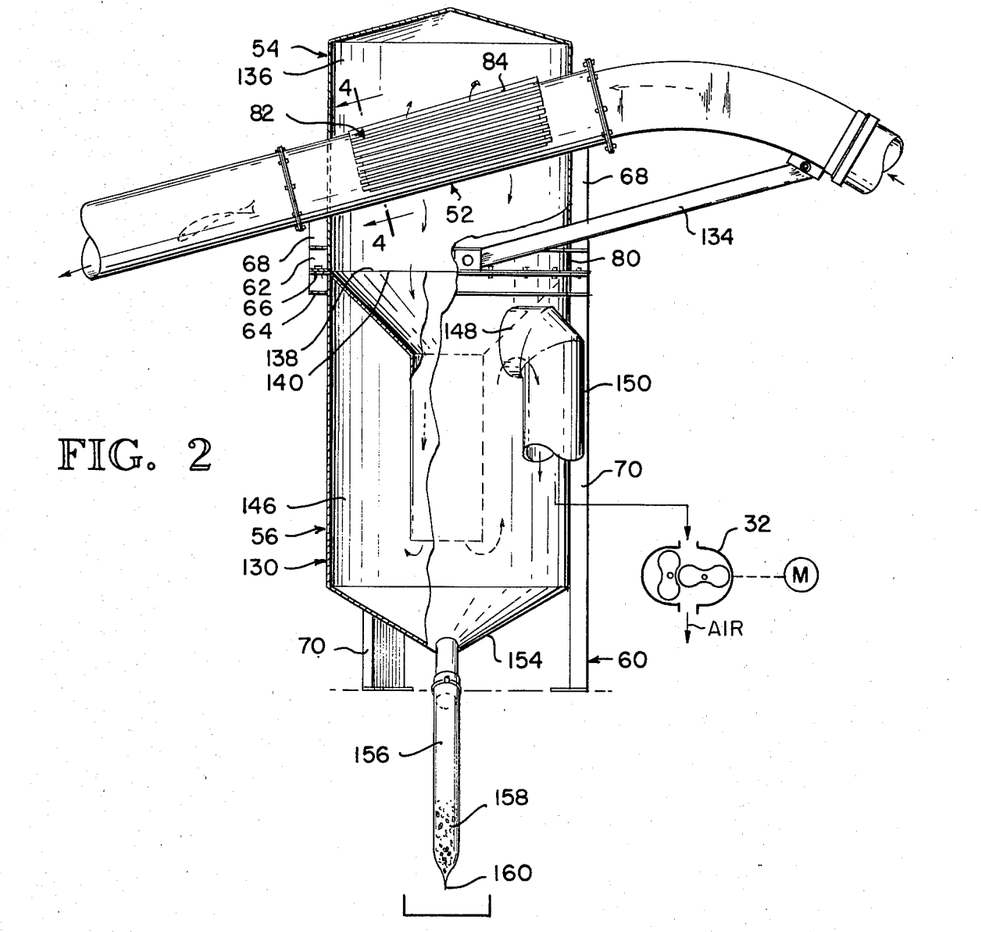
FIG. 2 is a partial side elevation with portions removed to illustrate the in line vertical assembly of an upper primary product separator, and a lower secondary liquid separator and portions of both the inlet conduit and the outlet conduit, and also the interior components.

The Combined Assembly of an In Line Upper Primary Product Separator and a Lower Secondary Liquid Separator In reference to the preferred embodiment 20, for conveying a fish like salmon as illustrated in FIG. 1, the preferred combined assembly 130 of an in line upper primary product separator 54 and a lower secondary liquid separator 56 is illustrated in FIG. 2 as this assembly 130 is installed in the overall vacuum pneumatic conveying apparatus 20. The fish 21 after flying up through the nozzle 36, flexible conduit 38, and non flexible conduit 44, are directed via non flexible conduit 46, positioned by brace 134 into the transverse, essentially internal conduit 52, which slopes downwardly in the direction of the product flow. The incoming vacuum air flow is soon expanded and directed out through the grilled exit 82 into the chamber 136 of the upper primary product separator 54, expanding both above, below, and alongside the internal conduit 52. The fish 21 are carried on through the internal conduit 52 by their momentum and on into the non flexible outlet conduit 88. Thereafter, via gravity, the fish continue on to a respective flexible conduit 96 or 98 to be collected and intermittently discharged through a self sealing discharge sleeve 106, often referred to as a sock and also as an air lock, as illustrated in FIG. 1.

The expanding air in the chamber 136 leaves down through the open bottom 138 of this product separator 54 which is matched to the open top 140 of the secondary liquid separator 56 where these two separators are joined together using the flanges 62, 64 of the separator support 60, which are also respectively common to them. This expanding air is then directed down into a funnel like central passageway 144, extending a substantial distance into the chamber 146 of the secondary liquid separator 56. The air at a higher speed is then reversed in direction upon leaving the central passageway 144 and guided in the chamber 146 to the above entry 148 of a vacuum air flow conduit 150. The air in making the reversal frees itself from particles of gurry and liquid, and in going on within the conduit 150 to the inlet below the rotary positive displacement blower, it is essentially well cleaned air.

The gurry and liquid moves downwardly out of the central passageway 144 into the slope sided bottom 154 of the secondary liquid separator 56 and beyond into a smaller movable outlet depending conduit 156. There the gurry and liquid forms into a changing group 158, and when the force from the combined weight exceeds the barometric pressure, a self sealing flexible discharge sleeve 160 intermittently opens to discharge the gurry and liquid.

The Grilled Exit of the Transverse Internal Conduit

Figure 3:
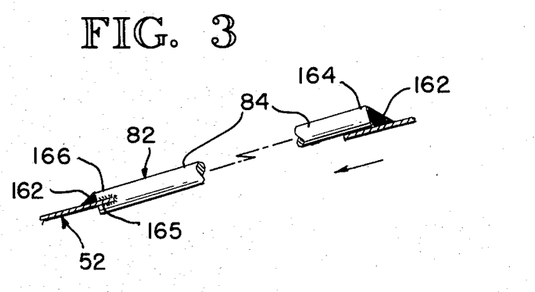
FIG. 3 is an enlarged partial side view, taken on line 3—3 of FIG. 4, with portions removed to illustrate the installation of one of the grill members in the vacuum air flow exit.
Figure 4:
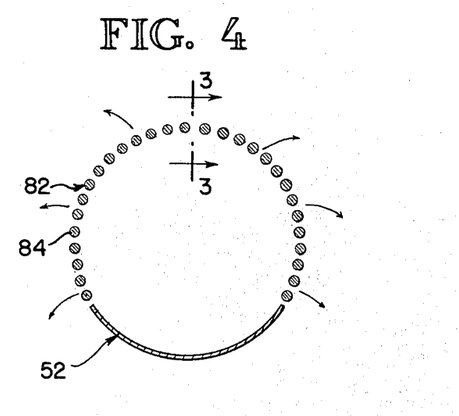
FIG. 4 is an enlarged partial cross sectional view taken on line 4—4 of FIG. 2, indicating the arrangement of the longitudinal grill members forming the grilled exit in the transverse downwardly sloping internal conduit which extends across and beyond the chamber of the primary product separator.

As illustrated in FIGS. 1 through 4, the transverse internal conduit 52 of the upper primary product separator 54 has a grilled exit 82. As shown in FIG. 3, the grills or bars 84 are welded 162 at their leading ends 164 to the outside of the transverse internal conduit 52 and welded 162 via a notch 165 at their tracking ends 166 to the transverse internal conduit 52. As so positioned, the grill ends 164 are well removed from the passing fish 21, thereby avoiding any bruising or cutting injury to the passing fish 21. The spacing of the grills or bars 84 is illustrated in FIG. 4. In one embodiment the grills are three eighths of an inch in diameter and they are spaced three sixteenths of an inch apart throughout two thirds of the circumference of the transverse internal conduit 52. The bottom one third is left as the solid continuation of the transverse internal conduit 52, over which the fish travel, via their momentum, as they pass through this conduit 52. The air exit area between the grills 84 is preferably fifty percent greater than the cross-sectional area of the transverse internal conduit 52.

Figure 5:
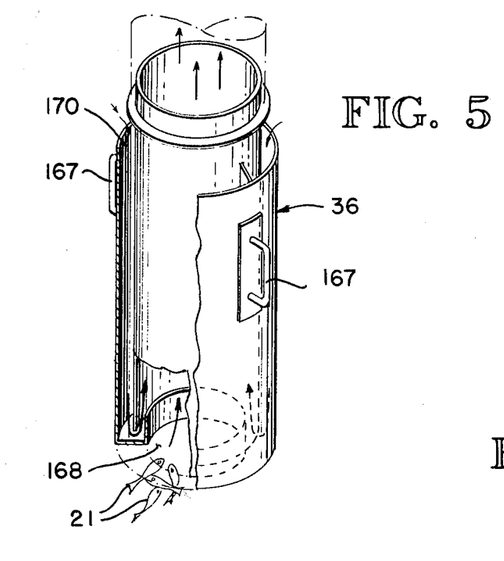
FIG. 5 illustrates a nozzle which is attachable to the inlet of the depending movable inlet conduit.

Preferred Nozzles Installed at the Inlets of the Movable Inlet Depending Conduits FIG. 5 illustrates a nozzle 36 with handles 167 previously used with other apparatus, and used when smaller fish 21 are being conveyed. Air is drawn in below through a central opening 168, and also above through a circumferential opening 170 and directed down adjacent the central opening 168 and then redirected upwardly providing a continuous flow of incoming air even when the central opening might become temporarily blocked by an oncoming grouping of fish 21.

Figure 6:
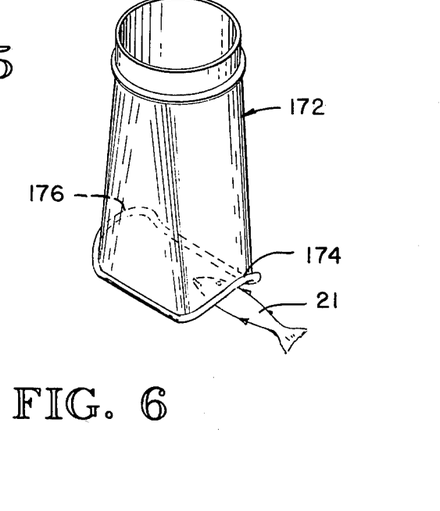
FIG. 6 illustrates a nozzle which is attachable to the inlet of the depending movable inlet conduit.

FIG. 6 illustrates a nozzle 172, used previously with other apparatus, and used when larger fish 21 are being conveyed. The respective longitudinal ends 174, 176, of this nozzle 172 are curved upwardly to accommodate the entry of larger fish and to avoid blockage of the incoming air flow by an oncoming grouping of fish 21.

Figures 7, 8, 9:
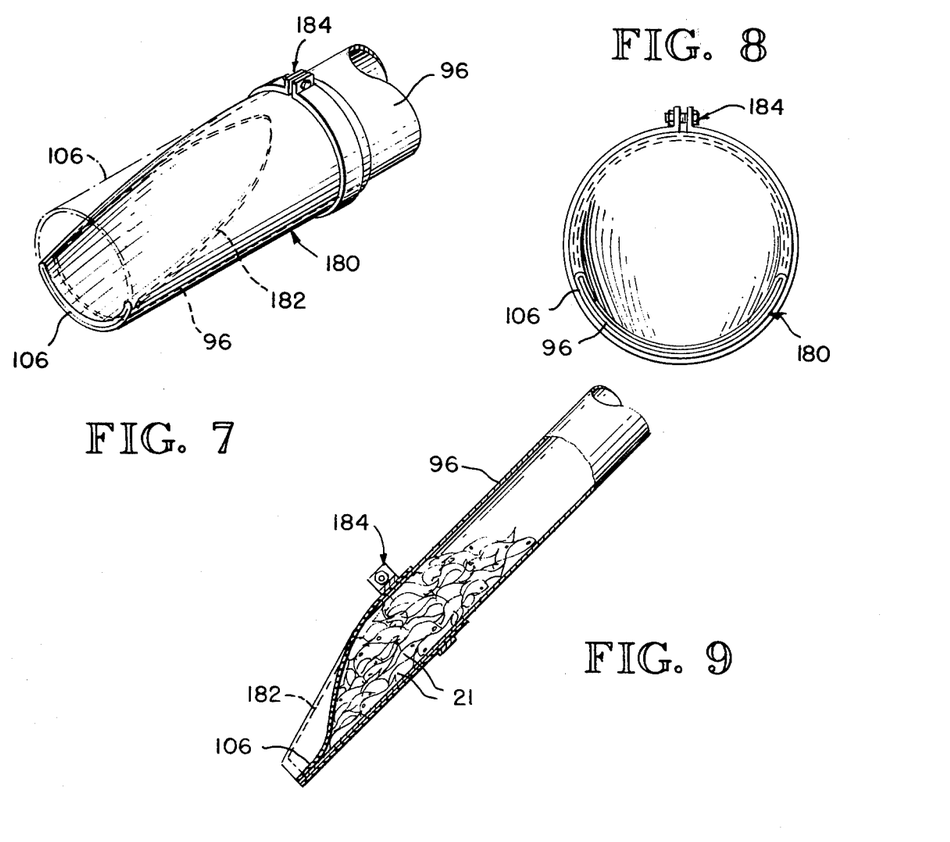
FIG. 7 is an enlarged orthographic partial view of the end portion of the depending movable outlet conduit.
FIG. 8 is an end view of the outlet conduit and surrounding self sealing flexible sleeve as shown in FIG. 7.
FIG. 9 is a partial view, on a smaller scale, to illustrate how the fish are collected at the outlet end of the outlet conduit.

Preferred Self Sealing Flexible Discharge Sleeve Assembly Installed at the Outlets of the Movable Outlet Depending Conduits As illustrated in FIGS. 1, 7, 8 and 9, a preferred self sealing flexible discharge sleeve assembly 180, previously used with other apparatus, is installed at the outlets of the movable outlet depending conduits, such as the flexible conduits 96, 98 shown in FIG. 1. The ends of these conduits 96, 98 are scarf cut 182. Thereafter, a self sealing flexible discharge sleeve 106 is passed over the scarf cut portion 182 and slightly beyond for a securement to the flexible conduit 96 or 98, using a clamping assembly 184. From the dotted line cylindrical position shown in FIG. 7, the self sealing flexible discharge sleeve 106 collapses to seal itself as shown in FIGS. 7, 8, and 9.

During vacuum air flow operations this self sealing flexible discharge sleeve 106 remains in a self sealing collapsed position to cause the collection of a group of fish 21 within the flexible conduit 96, as shown in FIG. 9. When the force from the weight of the changing grouping of fish 21 exceeds the barometric pressure, then the self sealing flexible discharge sleeve 106 intermittently opens to discharge fish 21. This discharge sleeve 106 is often referred to as a sock and also as an air lock.

Preferred Combined Rotary Baffled Valve Assembly With One or More Chambers

Figure 10:
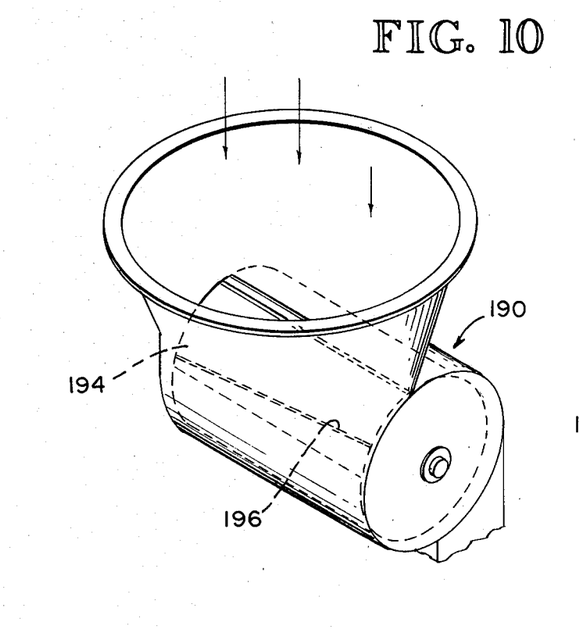
FIG. 10 is an orthographic view illustrating an air lock.
Figure 11:
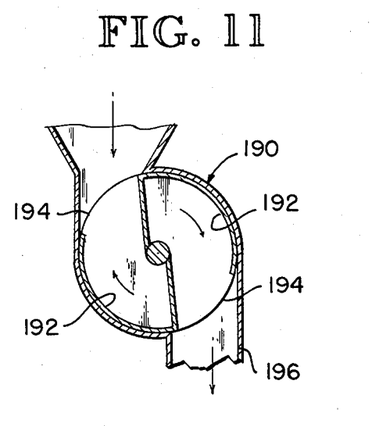
FIG. 11 is a partial cross-sectional view of the air lock shown in FIG. 10.
Figure 12:
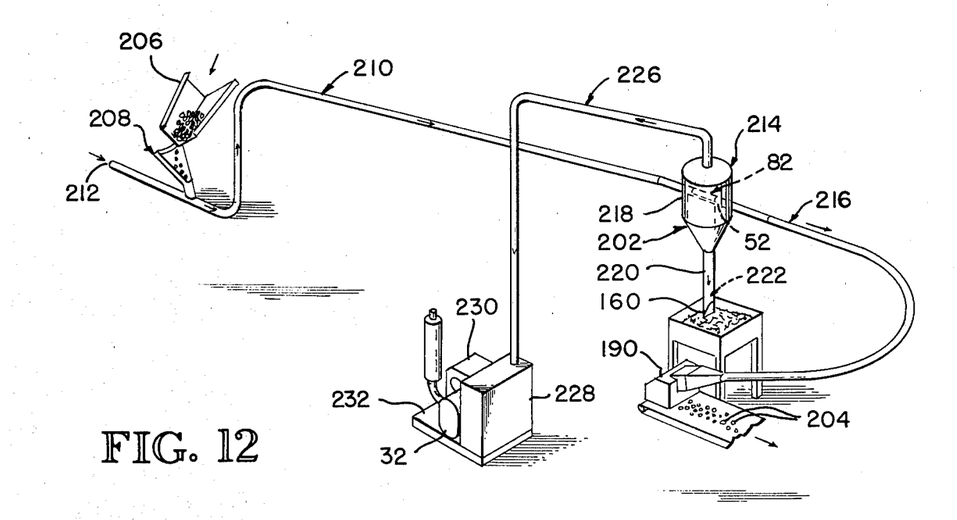
FIG. 12 is an orthographic view of food products, such as potatoes, being conveyed by using vacuum air flow conveying operations.

As illustrated in FIGS. 10, 11, and 12, a preferred combined rotary baffled valve assembly 190 with one or more chambers 192 having openings 194, each with a shear placed leading edge 196, previously used with other apparatus, is installed at the movable outlet depending conduit 98 to initially hold back food products and then intermittently discharge them. The arrows illustrate the flow direction of the vacuum air flow and also the rotation of the revolving chambers 192.

A Preferred Embodiment for Conveying a Vegetable Food Product Like Potatoes

In FIGS. 10, 11, and 12, a preferred embodiment 202 of a vacuum pneumatic conveying apparatus is illustrated being utilized to convey vegetables such as potatoes 204. They are discharged, for example, from a chute 206 of a truck, not shown, into a conveying transition assembly 208, and entered into an inlet depending conduit 210 beyond its entry 212. The potatoes 204 then fly to a primary product separator 214 having an internal transverse conduit 52. The vacuum air flow is expanded through a grilled exit 82, in this duct 52 changing its direction, and the potatoes continue on via their momentum entering the outlet depending conduit 216. They accumulate at the rotary baffled valve assembly 190 and are thereafter intermittently discharged.

The expanded vacuum air flow departs upwardly from a chamber 218 of the primary product separator 214. Any moisture liquid, and/or debris 222 drops downwardly within chamber 128 and continues on into a smaller outlet depending conduit 220 collecting in a changing group 222. Then when the force from the group weight exceeds the barometric pressure, the moisture, liquid, and/or debris is intermittently discharged, via a self sealing flexible sleeve 160.

The upwardly depending vacuum air flow is directed back down in a conduit 226 to an in line filter box 228 and on through a rotary positive displacement blower 32 and out through a silencer or muffler 116. A prime mover 230 completes a package installation mounted on the common base 232.

In this embodiment 202 and in embodiment 20 the in line product flow or straight through flow apparatus and methods are utilized. In this way there is no food product damaged by the apparatus. With the improved apparatus and methods illustrated and described in reference to these embodiments of the vacuum pneumatic conveying apparatus and method, in addition to this excellent non damaging conveying of the food products, there is excellent separation of the liqquid, gurry, and/or debris from the vacuum air flow so there will be no disruption of the overall operations by the improper accumulation or discharge of such liquid, gurry, and/or debris. This excellent separation operation is easily observed in transport conduits which are out of the vacuum air flow.

We claim:

1. A vacuum pneumatic conveying apparatus utilized to convey food products, such as to convey fish from a fishing boat to a fish tender or to a processing factory keeping the fish from being injured via avoiding damaging contact with any of this apparatus, comprising:

(a) a frame assembly of a horizontal base, a vertical support high rise support on this base, and a separator support on this vertical support;

(b) a combined assembly of an in line upper primary product separator, and a lower secondary liquid separator mounted on the frame assembly via the separator support and the vertical high rise support at a substantial elevation above the horizontal base, with this upper primary product separator to separate the fish from the air, essentialy being a chamber with an open bottom having inside a downwardly directed internal conduit which extends from its top outside entry downwardly and outwardly to its lower outside exit and this internal conduit has an upwardly and sideways facing longitudinally grilled air exit to allow the air to escape into this chamber of the upper primary product separator, and with the secondary liquid separator to separate liquid from air, essentially being a chamber with an open top to match the open bottom of the chamber of the upper primary product separator, having: a funnel like central interior passage; a higher circumferentially located air exit for air enroute toa blower; and a lower centered gurry and liquid exit;

(c) a rotary positive displacement blower mounted on the horizontal base of the frame assembly, and having a conduit connected from its inlet blow, to the higher circumferentially located air exit above of the secondary liquid separator, and having its exit directing the exhaust air to a silencer, and having a silencer to direct the exhaust air into the atmosphere at a convenient location;

(d) a movable inlet depending conduit to receive and to guideably fly fish from its point of inlet, having a nozzle, which is moved about in a hold of a fishing boat, with fish thereafter flying up through this inlet to the combined assembly above of the in line upper primary product separator, and the lower secondary liquid separtor, and having at its top, an exit fastening assembly for joining this movable inlet with the top outside entry of the inside downwardly directed internal conduit positioned within the chamber of the upper primary product separator;

(e) a movable outlet depending conduit to receive and to guide fish leaving the lower outside exit above, of the downwardly directed internal conduit within the chamber of the upper primary product separator, with their momentum assuring their continuation of travel by gravity downwardly to be collected and then discharged for example on sorting conveyors of a fish processing factory, having at its entry a fastener assembly for joining with the lower outside exit of the downwardly directed internal conduit, and having at its exit an easily manipulated self sealing flexible discharge sleeve capable of holding back a sufficient changing group of fish until their combined weight overcomes the barometric pressure head, to thereafter intermittently force open this otherwise self sealing flexible discharge sleeve; and (f) a smaller movable outlet depending conduit to receive and to guide gurry and liquid leaving the combined assembly of the in line upper primary product separator and the lower secondary liquid separator, having a fastener assembly for joining it to the lower secondary liquid separator, which in turn has the lower centered gurry and liquid exit to also receive the fastener assembly, and having a self sealing flexible discharge sleeve capable of holding back a sufficient temporarily collecting grouping of particles of gurry and liquid, until their combined weight overcomes the barometric pressure head, to thereafter intermittently force open this otherwise self sealing flexible discharge sleeve and the departing liquid and gurry is collected, eventually to be disposed of as waste or a waste product.

2. A vacuum pneumatic conveying apparatus utilized to convey food products, as claimed in claim 1, wherein instead of the self sealing flexible discharge sleeve connected to the exit of the movable outlet depending conduit, a combined rotary baffled valve assembly with one or more chambers is connected to this exit, whereby different individual weight and/or sized food products not suitable for sleeve discharge are collected in these follow on rotary chambers of this combined rotary baffled valve assembly for their intermittent delivery to adaptable receiving equipment of a food processing factory.

3. A vacuum pneumatic conveying apparatus utilized to convey food products, as claimed in claim 1 or 2, wherein instead of the assembly of the smaller movable outlet depending conduit and the connected self sealing flexible discharge sleeve, when there is no troublesome waste and/or water from a food product to be intermittently removed, the lower centered exit of the secondary liquid separator is essentially kept sealed during vacuum air flow operations, and unsealed only for inspections and possible debris and liquid removal, when vacuum flow operations are discontinued for a while.

4. A method of vacuum pneumatically conveying food products such as conveying fish from a fishing boat to a fish tender or to a fish processing factory, comprising the steps of:
  (a) creating an air flow under vacuum within closable passageways and chambers by operating a rotary positive displacement blower;
  (b) directing the created air flow upwardly from a lower inlet nozzle passable over and into the fish in a hold of a boat for their collection through a depending movable inlet conduit;
  (c) directing the air flow and fish leaving the inlet conduit downwardly within the top of an in line assembly of an upper primary product separator and a lower secondary liquid separator;
  (d) allowing the initially downwardly directed air flow to expand upwardly and sideways, independently of the fish, into a chamber of the upper primary product separator utilizing a transverse conduit with a grilled exit, as fish, after flying in the inlet conduit continue on via their momentum leaving the chamber;
  (e) directing the expanding air into a depending funnel like passageway within a chamber of the secondary liquid separator;
  (f) reversing the air flow within this chamber of the secondary liquid separator;
  (g) discharging the reversed air flow from the near top of this chamber for its conduit guided entry below into the intake of a rotary positive displacement blower and its subsequent discharge from this blower via a silencer;
  (h) collecting air and fish moving via gravity in an essentially non flowing depending column of air under vacuum in a movable depending outlet conduit connected above to a fish exit of the upper primary product separator and connected below to a self sealing flexible discharge sleeve, which opens intermittently under the then combined weight of an active changing group of fish, which overcomes the barometric pressure head; and
  (i) collecting air in another essentially non flowing depending column of air under vacuum in a movable smaller depending outlet conduit connected above to a gurry and liquid exit of the secondary liquid separator and connected below to a self sealing flexible discharge sleeve, which opens intermittently under the then combined weight of an active changing group of particles of gurry and liquid which overcomes the barometric pressure head.

5. A method of vacuum pneumatically conveying food products, as claimed in claim 4, wherein during the collecting of air in the essentially non flow depending column of air under vacuum in the movable depending outlet conduit connected above to a food product exit, instead of utilizing a self sealing flexible discharge sleeve, a combined rotary baffled valve with one or more chambers is utilized, whereby different weight and sized food products are collected in these follow on rotary chambers of this combined rotary baffled valve assembly with one or more chambers for their intermittent delivery to adaptable receiving equipment of a food processing factory.

6. A method of vacuum pneumatically conveying food products, as claimed in claim 4 or 5 wherein when there is no troublesome waste and/or liquid from a food product to be intermittently removed, then there is no collecting of air in another essentially non flowing depending column of air under vacuum in a movable smaller depending outlet conduit connected to an exit of the secondary liquid air separator, such exit then being essentially kept sealed during vacuum air flow operations, and unsealed only for inspections and possible debris and liquid removal, when vacuum flow operations are discontinued for a while.

7. A method of vacuum pneumatically conveying food products, comprising the steps of:
  (a) creating an air flow under vacuum within closable passageways and chambers by operating a rotary positive displacement blower;
  (b) directing the created air flow upwardly from a lower inlet nozzle movable over and through food products for their collection through a depending movable inlet conduit;
  (c) directing the air flow and collected food products into an in line vertical assembly of an upper primary product separator and a lower secondary liquid separator;
  (d) allowing the incoming air flow to expand upwardly and sidewise independently of the food products, into a chamber of the upper primary product separator utilizing a transverse conduit with a grilled exit, as the food products after flying into the primary receiver continue on via their momentum leaving through an exit of this upper primary product separator;
  (e) directing the expanding air into a depending central passageway within a chamber of the secondary liquid separator;
  (f) reversing the air flow within this chamber of the secondary air separator;
  (g) discharging the reversed air flow from near the top of this chamber for its conduit guided entry below into the intake of the rotary positive displacement blower and its subsequent discharge from this blower;

(h) collecting air and food products in an essentially non flowing depending column of air under vacuum in a movable depending outlet conduit connected above to an exit of the upper primary product separator and connected below to a food product sealable discharge assembly; and (i) intermittently opening the otherwise non flowing depending column of air under vacuum using the sealable discharge assembly to withdraw the food products from this column of air under vacuum for their entry into atmospheric air.

8. A vacuum pneumatic conveying apparatus utilized to convey food products, comprising:

(a) a combined vertical in line assembly of an upper primary product separator, and a secondary liquid air separator mountable above a ground, floor, or dock level, having a chamber within the upper primary product separator, and having a transverse internal conduit within this chamber, with this transverse conduit having a food product restricting grill through which the air flow expands upwardly and sideways, and having an entry and an exit in the upper primary product separator opposite the respective ends of this transverse internal conduit, and having a chamber within this secondary liquid separator, and having a depending central passageway within this chamber of the secondary liquid separator, and having a higher located air flow exit from the chamber of the secondary liquid separator;

(b) a rotary positive displacement blower mountable at ground, floor, or dock level, having a conduit connected from its inlet below to the air flow exit above of the secondary liqquid separator, and having exhaust air controllably directed from its exit into a silencer and then into the atmosphere;

(c) a movable inlet depending conduit to receive and to guidably fly food products from a point of inlet over and/or in a supply source below to the entry of the above combined vertical in line assembly of the upper primary product separator, and lower secondary liquid separator, having at its bottom entry, a nozzle creating the point of inlet easily manipulated with this conduit to closely pass above and/or in food products supply source, and having at its top exit a fastening assembly to secure it to the entry of the upper primary product separator;

(d) a movable outlet depending conduit to receive and to guide food products leaving the exit of the above combined vertical in line assembly of the upper primary product separator and the lower secondary liquid separator, having a fastening assembly to secure its top to the exit of the upper primary product separator and having an intermittently opening air lock assembly to withdraw food products from this movable outlet depending conduit; and (e) a depending conduit for receiving liquid from the lower secondary liquid separator, having a fastening assembly to secure its top to an exit of the lower secondary liquid separator, and having an intermittently opening air lock assembly to withdraw liquid from this depending conduit.

9. A vacuum pneumatic conveying apparatus utilized to convey food products, comprising:

(a) an inlet vacuum air flow conduit commencing at a lower elevation and terminating at a higher elevation;

(b) a food product conveying transition inlet positioned just beyond the commencement of the inlet vacuum air flow conduit;

(c) an elevated product separator chamber to receive food products flying upwardly within the inlet vacuum air flow conduit;

(d) a food product internal transfer conduit extending fully across the interior of the elevated product separator chamber and spaced below the top and spaced above the bottom of this chamber, and having a screened exit in this transfer conduit of an area very substantially larger than the cross sectional area of this transfer conduit, whereby the air flow changes direction and reduces in speed in leaving the transfer conduit, via this screened exit, and the food products via their momentum continue on within this transfer conduit;

(e) an outlet vacuum air conduit commencing at a higher elevation to receive the food products traveling via their momentum as they leave this transfer conduit, and terminating at a lower elevation;

(f) an air lock assembly on the outlet vacuum air conduit at the lower elevation to intermittently discharge the food products;

(g) a vacuum air flow conduit commencing above to receive the air flow, separated from the food products, leaving the elevated product separator chamber and continuing to the entry of a blower; and (h) a rotary positive displacement blower to receive the air flow, separated from the food product, and passing through the vacuum air flow conduit, and to discharge the air flow, via a silencer, into the atmosphere.

10. A vacuum pneumatic conveying apparatus as claimed in claim 9, comprising, in addition, a depending outlet vacuum air conduit to receive liquid and/or debris which may collect at the bottom of the elevated product spearator chamber, having a fastening assembly at its top to secure it to this chamber above and having at its bottom an air lock assembly to intermittently discharge liquid and/or debris.

11. A vacuum pneumatic conveying apparatus, as claimed in claim 9, comprising, in addition, a secondary liquid separator having a chamber to receive the vacuum air flow before it reaches the vacuum air flow conduit which continues on to the entry of the rotary positive displacement blower.

12. A vacuum pneumatic conveying apparatus, as claimed in claim 11, comprising, in addition, a central passageway within the secondary liquid separator to receive the air flow from above to direct the air flow downwardly, to release the air flow for its reverse air flow within this secondary liquid separator before the air flow reaches the vacuum air flow conduit which continues on to the entry of the rotary positive displacement blower.

13. A vacuum pneumatic conveying apparatus, as claimed in claim 11 or 12, comprising, in addition, a depending outlet vacuum air conduit to receive liquid and/or debris which may collect at the bottom of the secondary liquid separator, having a fastening assembly at its top to secure it to this separator and having at its bottom an air lock assembly to intermittently discharge liquid and/or debris.

14. A vacuum pneumatic conveying apparatus, as claimed in claim 9, 10, 11 or 12 wherein the screened exit in the food product internal transfer conduit is positioned above a continuing non screened exit portion of this internal transfer conduit, whereby the food products are directed over the non screened exit portion and the air flow is expanded upwardly and sideways through this screened exit.

15. A vacuum pneumatic conveying apparatus as claimed in claim 9, 10, 11 or 12 wherein, in lieu of a food product conveying transition inlet positioned just beyond the commencement of the inlet vacuum air flow conduit, a nozzle is installed at the inlet of the vacuum air flow conduit.

16. A vacuum pneumatic conveying apparatus, as claimed in claim 9, 10, 11 or 12 wherein the inlet vacuum air flow conduit is made flexible in part or in whole to enable the inlet to be conveniently moved to pick up food products from multiple locales.

17. A vacuum pneumatic conveying apparatus, as claimed in claim 9, 10, 11 or 12 wherein the inlet vacuum air flow conduit includes multiple entry branch conduit portions, and valves are installed in the entry branch conduit portions to open and to shut them.

18. A method of vacuum pneumatically conveying food products, comprising the steps of:
    (a) directing a vacuum air flow through a vacuum air flow conduit commencing at a lower elevation and terminating at a higher elevation;
    (b) positioning this vacuum air flow at the lower elevation below, over, and/or in food products, to thereby also direct the food products through vacuum air flow conduit;
    (c) delivering the food products and the continuing air flow to an elevated product separator chamber;
    (d) delivering the food products via their momentum across the product separator chamber using a transverse conduit;
    (e) diverting and expanding the air flow via a screened exit in the transverse conduit into the product separator chamber both above and below the transverse conduit;
    (f) directing the food products coming from the transverse conduit into an outlet vacuum air conduit and directing the food products downwardly;
    (g) collecting the food products at and near a lower exit of the outlet vacuum air conduit;
    (h) intermittently discharging the collecting food products using an air lock assembly;
    (i) directing the diverted and expanded air flow leaving the product separator chamber via a vacuum air flow conduit, to the entry of a blower;
    (j) operating a positive displacement blower to receive the air flow, separated from the food products, leaving the elevated product separator chamber, and continuing on in the vacuum air flow conduit to the entry of this blower, and to discharge this air flow, via a silencer, into the atmosphere.

19. A method of vacuum pneumatically conveying food products, as claimed in claim 18, comprising, in addition, the steps of collecting liquid and/or debris which may emerge at the bottom of the elevated product separator chamber, and depositing the liquid and/or debris intermittently using an air lock assembly for its disposal.

20. A method of vacuum pneumatically conveying food products, as claimed in claim 19, comprising, in addition, before collecting liquid and/or debris and before intermittently depositing the liqquid and/or debris, additionally separating the liquid and/or debris by utilizing a secondary liquid separator having a chamber with a central passageway, as the air flow is reversed within this chamber, causing such separation of the liquid and/or debris from the air flow.

* * * * *